(12) United States Patent
Johnson et al.

(10) Patent No.: US 6,424,804 B1
(45) Date of Patent: Jul. 23, 2002

(54) MODULAR AIRBORNE FLIR SUPPORT AND EXTENSION STRUCTURE

(75) Inventors: Jack M. Johnson; David L. Hinote; Walt H. Thompson, all of Wichita; Gary N. White, Derby; Tim J. Johnson, Wichita; Paul Durrenberger, Derby, all of KS (US)

(73) Assignee: Cessna Aircraft Company, Wichita, KS (US)

( * ) Notice: Subject to any disclaimer, the term of this patent is extended or adjusted under 35 U.S.C. 154(b) by 0 days.

(21) Appl. No.: 09/752,851

(22) Filed: Dec. 27, 2000

(51) Int. Cl.[7] ............ G03B 39/00; H04N 7/00; H04N 7/18
(52) U.S. Cl. ............ 396/12; 348/117; 348/144
(58) Field of Search .............. 396/427, 433, 396/7, 12; 348/117, 144

(56) References Cited

U.S. PATENT DOCUMENTS

| | | | | |
|---|---|---|---|---|
| 3,917,199 A | * | 11/1975 | Dewitt | 244/188 R |
| 4,114,839 A | * | 9/1978 | Sibley et al. | 244/118 R |
| 5,184,521 A | * | 2/1993 | Tyler | 74/5.34 |
| 5,365,291 A | * | 11/1994 | Maeda | 354/74 |
| 5,383,645 A | * | 1/1995 | Pedut et al. | 248/637 |
| 5,531,403 A | * | 7/1996 | Tyler | 244/188.1 |
| 5,568,189 A | * | 10/1996 | Kneller | 348/144 |
| 5,752,088 A | * | 5/1998 | Desselle | 396/12 |
| 5,894,323 A | * | 4/1999 | Kain et al. | 348/116 |
| 5,995,758 A | * | 11/1999 | Tyler | 396/13 |

\* cited by examiner

Primary Examiner—Russell Adams
Assistant Examiner—Melissa Koval
(74) Attorney, Agent, or Firm—Edward L. Brown, Jr.

(57) ABSTRACT

A modular camera support and extension structure which removably mounts on the seat tracks of a conventional aircraft and extends through a cargo pod door during usage, including a box structure containing a plurality of vertical rails which support a tracking plate positioned inside the box structure with linear bearings around its periphery, slidably mounted on said rails for vertical movement from a retracted position to an extended position; a camera rotatably mounted on the bottom of said tracking plate about a vertical axis; a pair of actuating sprockets connected by a drive chain mounted on the box structure, the drive chain is connected to the tracking plate for moving the FLIR camera from its retracted position to its extended position; a box frame structure mounted on the aircraft skin which includes stops on the box frame which lockingly engage the tracking plate in its extended position.

7 Claims, 4 Drawing Sheets

MODULAR AIRBORNE FLIR SUPPORT AND EXTENSION STRUCTURE

FIELD OF THE INVENTION

This invention on relates generally to airborne imaging systems and more particularly to infrared camera tracking of vehicles and individuals from surveillance aircraft.

BACKGROUND OF THE INVENTION

The use of cameras in aircraft for aerial mapping has been widely used in the latter half of the 20th century for not only aerial mapping but also forest management, agricultural surveys, weather, and surveillance as exemplified in U.S. Pat. No. 4,114,839 issued to Sibley. This patent illustrates a camera extension structure for aircraft having conventional rear opening ramps which open and extends the camera horizontally into the slipstream to rear of the aircraft.

There have been various other methods of supporting and extending various types of cameras in aircraft, such as U.S. Pat. No. 5,894,323 to Kain, which mounts a camera platform in the place of a baggage door on the side of an aircraft which can be quickly removed for a non-photo mission.

US. Pat. No. 3,917,199 to Dewitt teaches a detachable pod which removably attaches to the bottom of the fuselage and contains a plurality of aerial photography cameras the operation of which are controlled from the inside of the aircraft. This detachable pod is also removable for other uses of the aircraft.

SUMMARY OF THE INVENTION

The present invention is a support and extension structure for an infrared camera generally referred to as a FLIR which is modular and quickly removable from the aircraft. The FLIR, its support and extension structure is mounted and supported on the aircraft seat tracks over an opening in the floor of the fuselage and a sliding door in the cargo pod located under the fuselage. The FLIR extension structure comprises a box structure containing a plurality of vertically positioned tails which in turn support a tracking plate having linear bearings around its periphery for sliding up and down the rails which in turn supports the FLIR camera rotatably mounted on the bottom thereof about a vertical axis. The tracking plate can extend from its retracted position with the FLIR camera fully within the aircraft to an extended position with the FLIR camera extending into the slipstream. The tracking plate is actuated by two pairs of sprockets connected by drive chains which are mounted to the box structure and the drive chains are connected to the tracking plate for moving the tracking plate and FLIR camera. The sprockets are driven by a motor through a drive shaft which lowers the tracking plate against a box frame structure attached to the skin of the aircraft which stops the tracking plate and retains the camera in a precise aligned position. When the FLIR camera is fully retracted, the aircraft has a conventional appearance as a normal cargo-carrying aircraft.

The principal object of the present invention is to provide a support and extension structure for a FOR camera which extends through a sliding door in a conventional cargo pod.

Another object of the present invention is to provide a support and extension structure for a FLIR camera which is not visible from the exterior of the aircraft in its retracted position.

A further object of the present invention is to provide a modular and readily removable FLIR camera support and extension structure from an aircraft.

Other objectives and advantages of the invention will become more apparent after referring to the Mowing specifications and attached drawings.

BRIEF DESCRIPTION OF THE DRAWING

For a better understanding of the present invention, reference is made to the accompanying drawings which ate incorporated herein by reference and in which.

DETAILED DESCRIPTION OF THE PREFERRED EMBODIMENT

Figure 2:
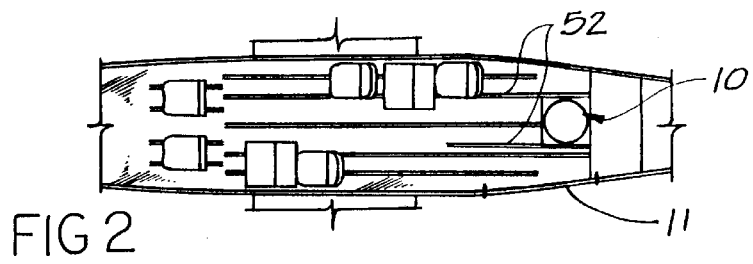
FIG. 2 is a partial top plan view of the fuselage in section with portions broken away to illustrate the position of the FLIR support structure.
Figure 1:
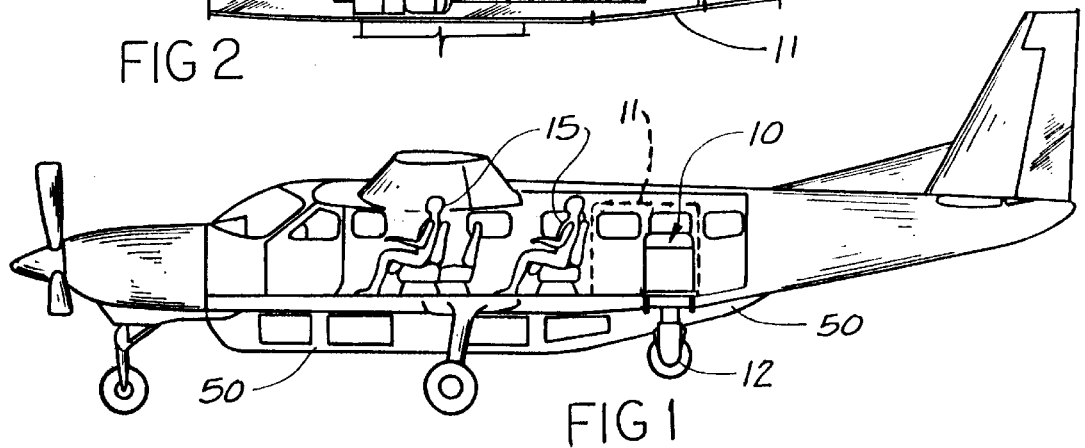
FIG. 1 is a side view of the aircraft with portions broken away to illustrate the positioning of the FLIR camera in its extended position.
Figure 3:
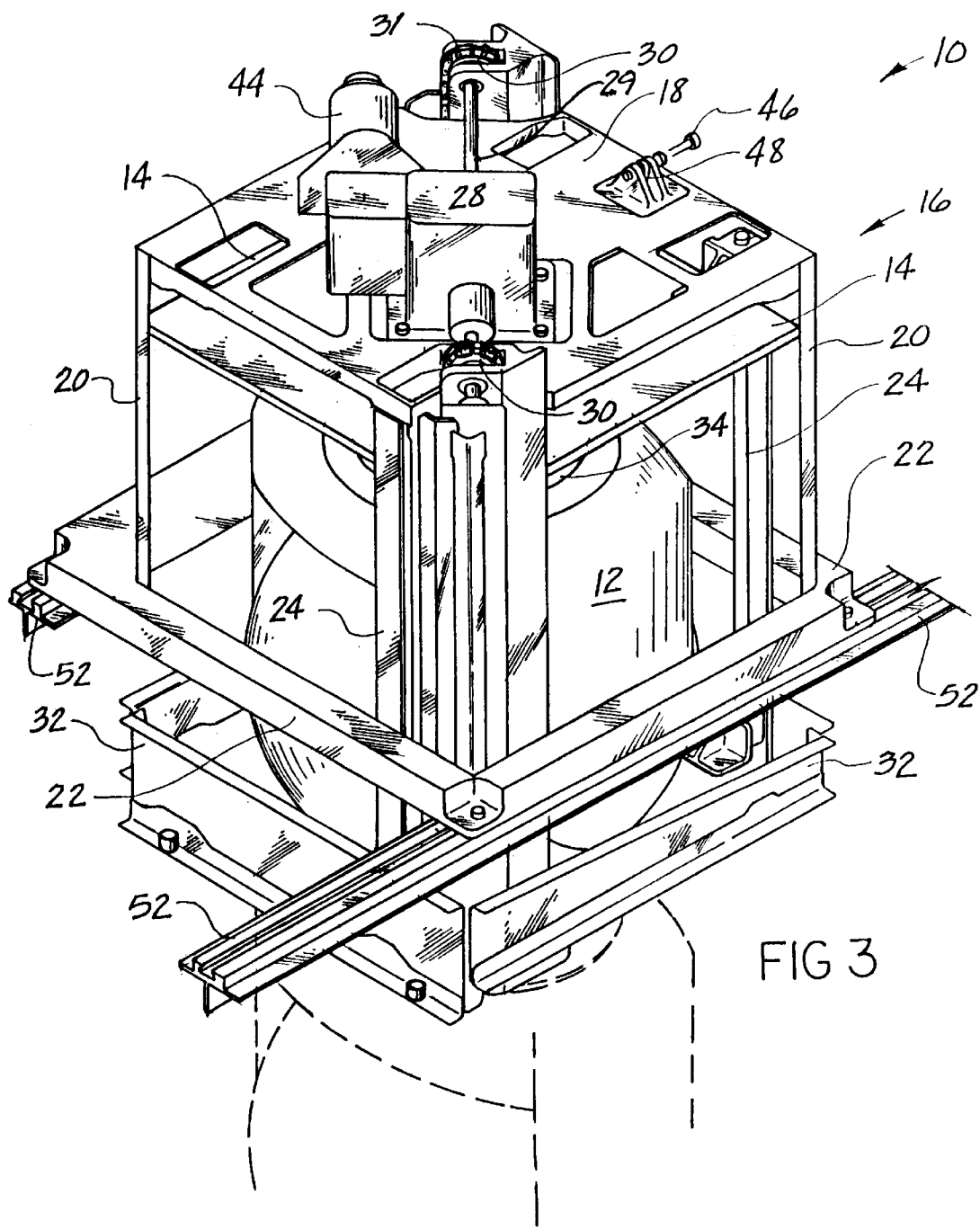
FIG. 3 is a perspective view of the FLIR support structure with the FLIR in the retracted position and portions of the box structure and top cover removed.
Figure 5:
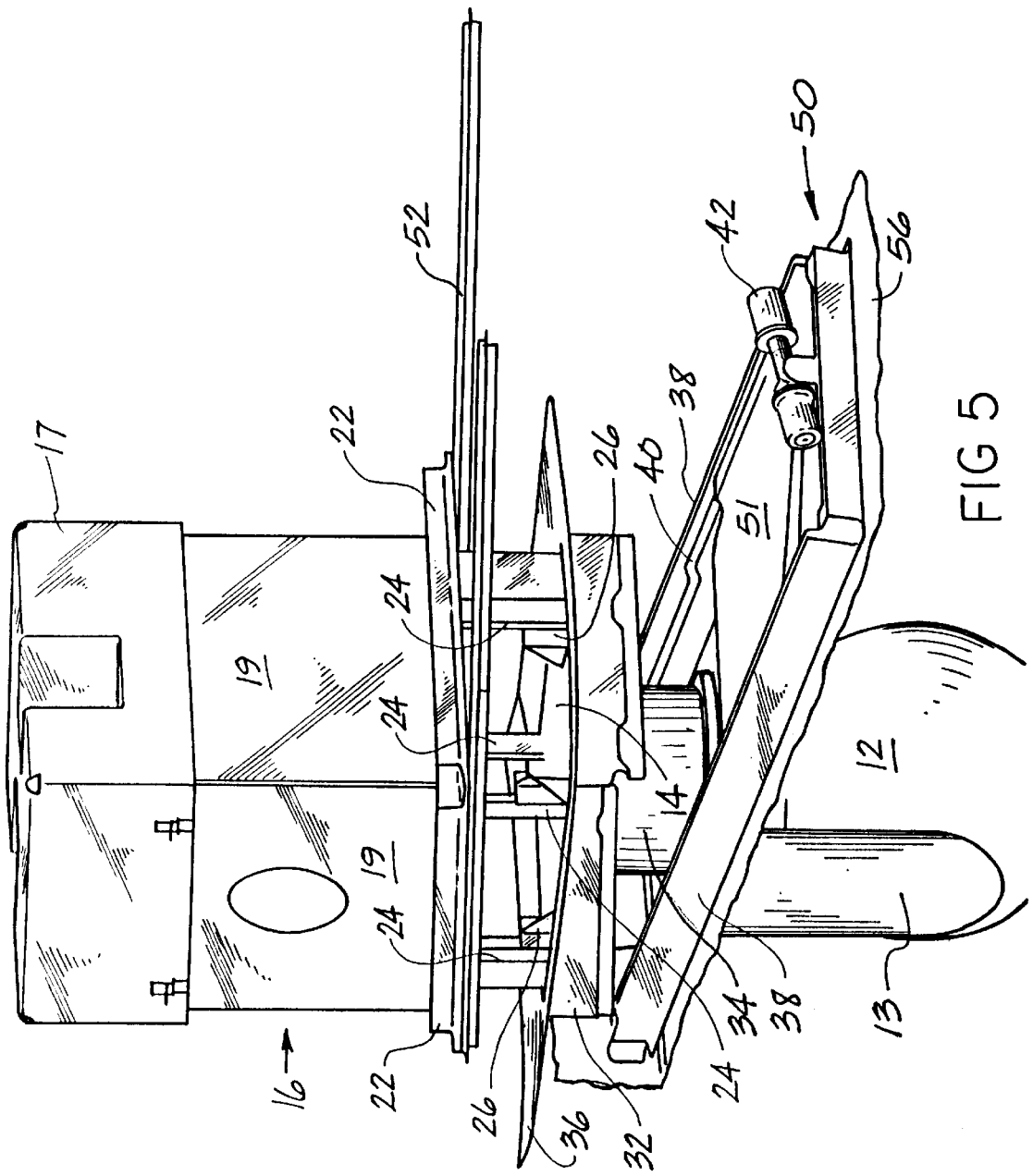
FIG. 5 is a perspective view of the FLIR support and extension structure, and the connecting aircraft structure, the cargo pod and opened door through which the FLIR is extended in its operative position; and, FIG. 6 is a symbolic illustration of the extension structure of the camera.

FIG. 1 generally illustrates the location of the FLIR support and extension structure, which is generally identified by reference 10. Personnel 15 positioned in front of monitors control the operation of the FLIR camera which can be multiple cameras. The FLIR and its support structure are modular and easily removable from the aircraft through door 11 by a portable crane, forklift, or cherry picker, not shown in the drawing. The support structure and camera 10 are mounted on and carried by seat rails 52, as shown in FIGS. 2 and 3. The FLIR in its retracted position, shown in FIG. 3, is completely within the cargo pod 50 and is covered by a closed sliding door 51, which is shown in FIG. 5. The FLIR support structure extends downwardly through an opening in the aircraft fuselage 36 as shown in FIG. 5. The weight of the FLIR and its support structure is transferred to the seat rails 52 of the aircraft through a pallet 22, as shown in FIGS. 3 and 5.

Figure 4:
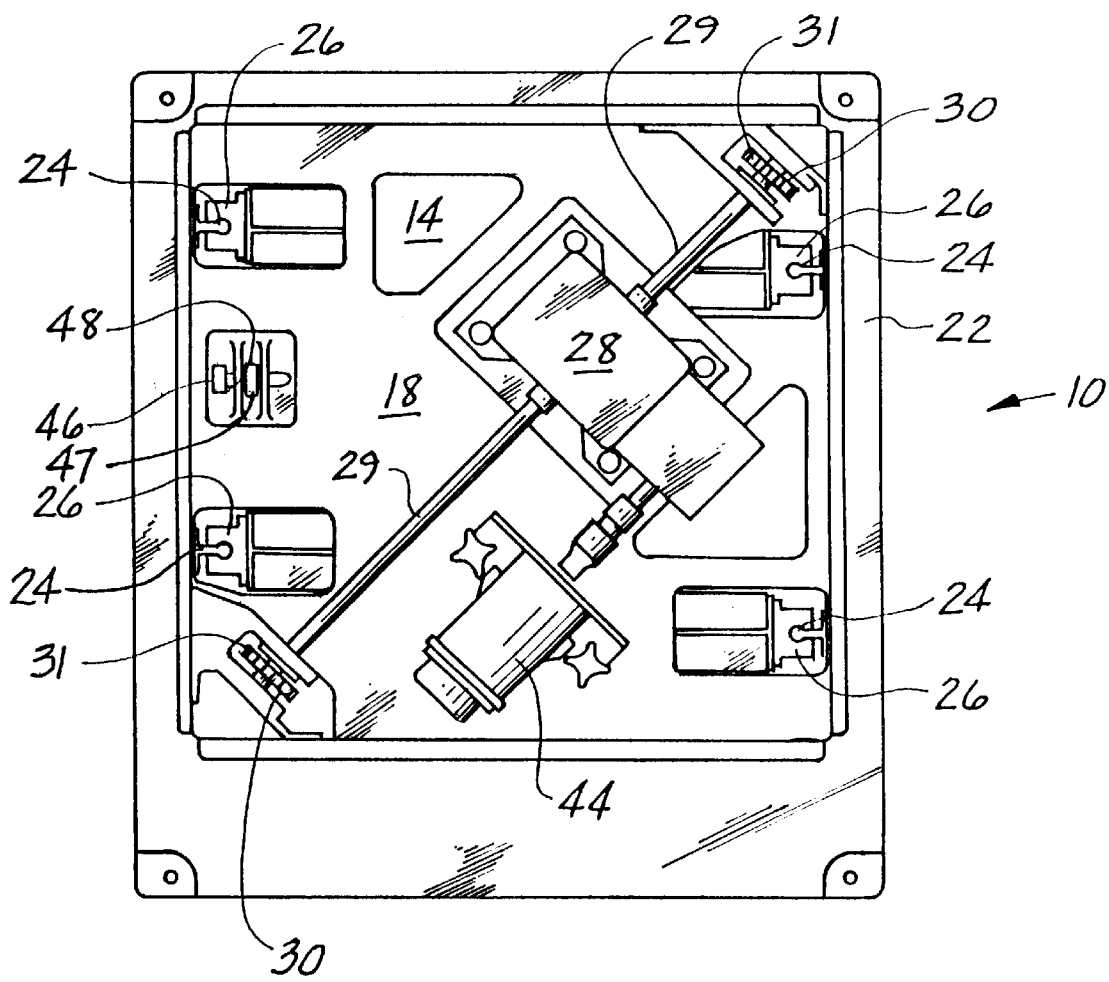
FIG. 4 is a top view of the FLIR support structure with the top cover removed.

The support structure for the FLIR camera comprises a stationary box structure 16, as seen in FIG. 3, comprising corner logs 20, which join a top plate 18 to the pallet structure 22. Supported by the box structure 16 are a plurality of four vertical guide rails 24, only which two can be seen in FIG. 3, while all four are shown in FIG. 4. These guide rails 24 precisely control the movement and alignment of tracking plate 14 and the FLIR through linear bearings 26 as best seen in FIG. 4. Attached to the bottom of tracking plate 14 is a sleeve 34 which attaches to FLIR protective housing 12. FLIR housing 12 is spherical in shape having a planer surface window 13, as shown in FIG. 5, through which the FLIR camera functions.

The FLIR camera or cameras, which are not shown, can be any type and size of those currently on the market as exemplified in U.S. Pat. No. 5,383,645. The FLIR camera is gimbal mounted so that it rotates about vertical and horizontal axis so that it can look in any direction or track any object as the aircraft moves, none of which is part of the present invention.

Figure 6:
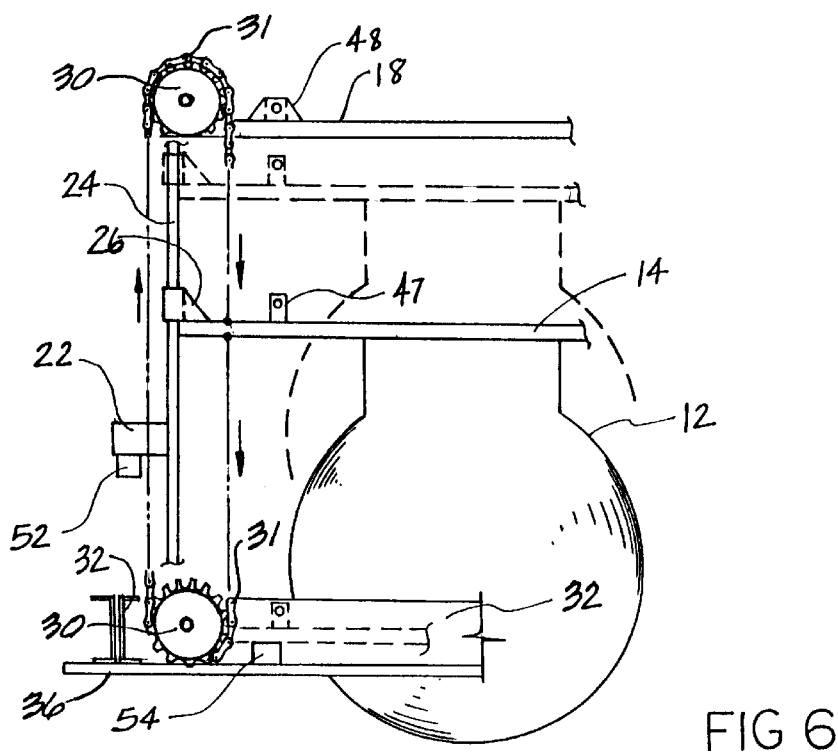

The drive mechanism for extending and retracting the FLIR housing 12, includes two pairs of sprockets 30 mounted on opposite corners of box structure 16 as seen in FIG. 3 with two of the sprockets 30 located at the top of the box structure 16 while a mating pair of sprockets, not seen in FIG. 3, are located at the bottom of the box structure. The sprockets 30 are connected by a drive chain 31, as best seen in FIG. 6. Drive chain 31 in turn is connected to tracking plate 14 for extending the FLIR from its fully retracted position in FIG. 3 to its fully extended position as shown in FIG. 5.

The drive means for the FLIR support structure comprises a motor 44, as seen in FIGS. 3 and 4, which drives a gear box 28 which in turns drives sprockets 30 through a common drive shaft 29, all of which is common structure well-known in the art and not shown in detail. Motor 44 can be quickly removed and replaced by a hand crank, not shown, if needed.

In its fully extended position, the tracking plate 14 is lowered until it comes in contact with resilient stops 54, as shown in FIG. 6, which are mounted around the peripheral box frame 32. Box frame 32 in turn is structurally connected to the skin 36 of the aircraft through skin doublers, not shown in the drawings. Once tracking plate 14 is tightly driven against stops 54 and the box frame, the positioning of the FLIR is very precise and rigid with a range of movement of + or −0.005 inches.

In its fully retracted position, a safety lock pin 46, shown in FIGS. 3 and 4, engages rod 47 through a clevis 48 which extends upward from tracking plate 18, thus locking the tracking plate in its retracted position regardless of any forces transmitted through the previously described drive means. Conventional limit switches, which are not shown in the drawing, are utilized to define the fully extended and fully retracted positions of the FLIR support structure 10 which stop drive motor 44.

FIG. 5 of the drawing illustrates a portion 56 of the rear bottom surface of cargo pod 50 which includes a sliding door 51 which is actuated by door motor 42, all of which is well-known in the art. The door mechanism includes a pair of door tracks 40 with offset portions which in the fully closed position move the door 51 in an offset direction so that the outer surface of the door is actually flush with the skin of the cargo pod 50.

The box structure 16 in normal use is fully covered as illustrated in FIG. 5 including a removable cover 17 and four side panels 19.

Different height sleeves 34 can be used for different size applications and different FLIR cameras.

It will be appreciated by persons skilled in the art that the present invention is not limited by what has been particularly shown and described herein above. Rather, the scope of the present invention is defined only by the claims which follow.

What is claimed is:

1. A modular removable camera support and extension structure which mounts in an aircraft having a skin, on conventional aircraft seat tracks and extends through a cargo pod door during usage comprising:

a box structure containing a plurality of vertically positioned rails, and a bottom pallet supporting the box structure which releasably attaches to the seat-tracks of the aircraft;

a tracking plate positioned inside the box structure with linear bearings around its periphery; each bearing slideably mounted on said rails for vertical movement from a retracted position to an extended position;

a camera rotatably mounted to the bottom of said tracking plate about a vertical axis;

at least one pair of actuating sprockets connected by a drive chain mounted on the box structure, the drive chain is connected to the tracking plate for moving the camera from its retracted position to is extended position;

a drive means connected to one of said sprockets for moving said camera from its retracted position to its extended position outside the cargo pod door;

a box frame structure mounted to the aircraft skin;

stop means on the box frame which lockingly engages the tracking plate in its extended position.

2. A removable camera support and extension structure, as set forth in claim 1, including a top plate in the box structure and a locking means mounted on the top plate, which releasably engages the tracking plate in its fully retractable position preventing the tracking plate from movement.

3. A removable camera support and extension structure, as set forth in claim 1, wherein the box structure includes four rails which extend below the bottom pallet; a top plate which supports the drive means, said pair of sprockets has one positioned above the top plate and the other positioned below the bottom pallet permitting the tracking plate to extend below the bottom pallet.

4. A removable camera support and extension structure, as set forth in claim 1, including an opening in the bottom of the aircraft skin below the camera support and extension structure, said box frame is positioned in said opening and is vertically aligned with the cargo pod door.

5. A removable camera support and extension structure, as set forth in claim 1, including an opening in the bottom of the aircraft skin, a cargo pod on the bottom of the aircraft covering said opening, the FLIR camera in the fully retracted position extends through said opening into the cargo pod.

6. A removable camera support and extension structure, as set forth in claim 1, including an opening in the bottom of the aircraft skin, said box frame is positioned in said opening and is vertically aligned with the cargo pod door.

7. A modular removable camera support and extension structure, which mounts in an aircraft having a skin, on conventional aircraft seat tracks and extends through a cargo pod door during usage comprising:

a cargo pod attached to the bottom of the aircraft skin and extending rearward past the passenger compartment;

a sliding door in said pod;

a box structure containing a plurality of vertically positioned rails, and a bottom pallet supporting the box structure which releasably attaches to the seat tracks of the aircraft;

a tracking plate positioned inside the box structure with lineal bearings around its periphery; each bearing slideably mounted on said rails for vertical movement from a retracted position to an extended position;

a camera rotatably mounted to the bottom of said tracking plate about a vertical axis;

at least one pair of actuating sprockets connected by a drive chain mounted on the box structure, the drive chain is connected to the tracking plate for moving the camera from its retracted position to is extended position;

a drive means connected to, one of said sprockets for moving said camera from its retracted position to its extended position outside the cargo pod door;

a box frame structure mounted to the aircraft skin; stop means on the box frame which lockingly engages the tracking plate in its extended position.

\* \* \* \* \*

UNITED STATES PATENT AND TRADEMARK OFFICE
CERTIFICATE OF CORRECTION

PATENT NO. : 6,424,804 B1
DATED : July 23, 2002
INVENTOR(S) : Jack M. Johnson, David L. Hinote, Walt H. Thompson, Gary N. White, Tim J. Johnson and Paul Durrenberger It is certified that error appears in the above-identified patent and that said Letters Patent is hereby corrected as shown below:

Column 1,
Line 40, "tails" should be corrected to -- rails --
Line 58, "FOR" should be corrected to -- FLIR --

Column 2,
Line 2, "Mowing" should be corrected -- following --
Line 7, "ate" should be corrected to -- are --
Line 50, "logs" should be corrected to -- legs --

Column 3,
Line 3, "comers" should be corrected to -- corners --

Signed and Sealed this

Nineteenth Day of November, 2002

*Attest:*

JAMES E. ROGAN
*Attesting Officer*     *Director of the United States Patent and Trademark Office*